United States Patent [19]

Morimoto

[11] Patent Number: 5,033,571
[45] Date of Patent: Jul. 23, 1991

[54] DRIVE SPEED CONTROL SYSTEM FOR A MOTOR VEHICLE HAVING A CONTINUOUSLY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 513,008

[22] Filed: Apr. 20, 1990

Related U.S. Application Data

[63] Continuation of Ser. No. 233,026, Aug. 16, 1988, abandoned.

[30] Foreign Application Priority Data

Aug. 31, 1987 [JP] Japan .................................. 62-217551

[51] Int. Cl.$^5$ ........................ B60K 31/04; B60K 31/10
[52] U.S. Cl. ..................................... 180/176; 180/179; 364/424.1; 74/866
[58] Field of Search ........................ 180/176, 178, 179; 364/426.04, 424.1; 74/860

[56] References Cited

U.S. PATENT DOCUMENTS

| | | | |
|---|---|---|---|
| 4,535,865 | 8/1985 | Tanigawa et al. | 180/179 |
| 4,553,621 | 11/1985 | Hyodo et al. | 180/179 |
| 4,730,518 | 3/1988 | Miyawaki | 364/424.1 |
| 4,736,813 | 4/1988 | Hayama et al. | 180/179 |
| 4,767,382 | 8/1988 | Tezuka et al. | 364/424.1 |
| 4,771,656 | 9/1988 | Itoh et al. | 74/866 |

FOREIGN PATENT DOCUMENTS

| | | | |
|---|---|---|---|
| 60-135335 | 7/1985 | Japan | 364/426.04 |
| 135832 | 6/1986 | Japan | 180/176 |

Primary Examiner—Charles A. Marmor
Assistant Examiner—Tamara L. Finlay
Attorney, Agent, or Firm—Martin A. Farber

[57] ABSTRACT

A control system for a motor vehicle has a continuously variable transmission, a transmission ratio control system for controlling the transmission ratio, and a cruise control system for controlling speed of the vehicle to a desired cruising speed. A resume switch is provided for producing an acceleration signal during cruising of the vehicle. In response to the acceleration signal, a throttle valve of the engine is opened, and the transmission ratio is downshifted by a predetermined value.

1 Claim, 4 Drawing Sheets

DRIVE SPEED CONTROL SYSTEM FOR A MOTOR VEHICLE HAVING A CONTINUOUSLY VARIABLE TRANSMISSION

This application is a continuation of my co-pending application Ser. No. 07/233,026 filed Aug. 16, 1988, now abandoned.

BACKGROUND OF THE INVENTION

The present invention relates to a drive speed control system for controlling the transmission ratio and a constant speed drive for a motor vehicle, and more particularly to a system for accelerating the vehicle during the constant speed drive.

In a control system for a constant speed drive (hereinafter called a cruise control system) for a motor vehicle having an automatic transmission, when the acceleration of the vehicle is selected by the driver, the vehicle is accelerated by increasing the opening degree of a throttle valve without downshifting the transmission.

Japanese Patent Application Laid-Open 60-135335 discloses a cruise control system for a motor vehicle with a continuously variable belt-drive automatic transmission (CVT) wherein a current control means is provided for controlling current passing to a vacuum operated throttle actuator in accordance with the difference between a set vehicle speed Vs and an actual vehicle speed V. A correcting means is provided for correcting transmission ratio i for the transmission in accordance with current or a control signal for the current control means, thereby controlling the actual vehicle speed V to the set vehicle speed Vs.

However, the acceleration of the vehicle depends solely on the increasing rate of the engine torque. Thus, the vehicle is slowly accelerated.

SUMMARY OF THE INVENTION

The object of the present invention is to provide a cruise control system for a vehicle having a CVT where the vehicle is quickly accelerated with sufficient engine torque.

According to the present invention, there is provided drive speed control system for a motor vehicle having an engine with a throttle valve, a continuously variable transmission, a transmission ratio control system for the transmission, and a cruise control system for controlling speed of the vehicle to a desired cruising speed. The cruise control system has a resume switch for producing an acceleration signal.

In response to the acceleration signal, an actuator is operated to open the throttle valve, and the transmission is downshifted a predetermined value.

The other objects and features of this invention will become understood from the following description with reference to the accompanying drawings.

DETAILED DESCRIPTION OF THE PREFERRED EMBODIMENT

Figure 1:
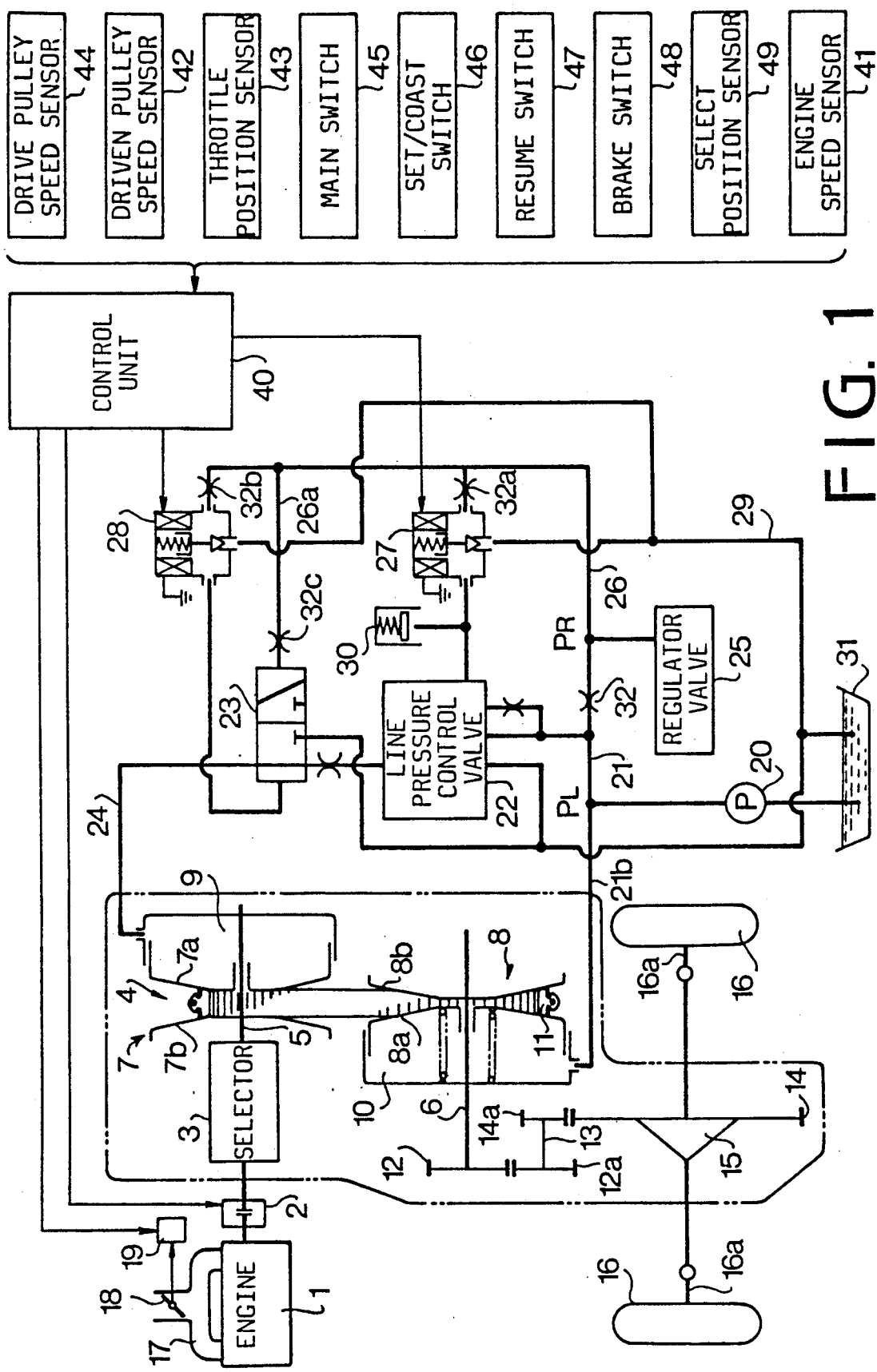
FIG. 1 is a schematic illustration of a power transmission system including a continuously variable belt-drive transmission for a motor vehicle according to the present invention.

Referring to FIG. 1, a motor vehicle is provided with an engine 1, and an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9 formed on the main shaft 5 to provide a servo device.

A fixed conical disc 8b of the driven pulley 8 is formed on the output shaft 6 opposite a movable conical disc 8a which is axially slidably mounted on the output shaft 6. The conical disc 8a has a cylindrical portion which is slidably engaged in a cylinder 10 of the output shaft 6 to form a servo device. A drive belt 11 engages with the drive pulley 7 and the driven pulley 8.

The cylinder 9 of the drive pulley 7 is so designed that the pressure receiving area thereof is larger than that of the cylinder 10 of the driven pulley 8. Thus, the running diameter of the drive belt 11 on the pulleys is varied by hydraulic pressure control of the cylinder 9 dependent on driving conditions.

Secured to the output shaft 6 is a drive gear 12 which engages with an intermediate reduction gear 12a on an intermediate shaft 13. An intermediate gear 14a on the shaft 13 engages with a final gear 14. The rotation of the final gear 14 is transmitted to axles 16a of vehicle-driving wheels 16 through a differential 15.

A throttle valve 18 is mounted in an intake manifold 17 of the engine 1. An actuator 19 is operatively connected to the throttle valve 18 for controlling the throttle valve in accordance with an output signal from a control unit 40.

Describing a hydraulic circuit of the transmission 4, the cylinder 9 of the drive pulley 7 is supplied with pressurized oil by an oil pump 20 from an oil reservoir 31 passing through a line pressure passage 21, a line pressure control valve 22, transmission ratio control valve 23, and passage 24. The cylinder 10 of the driven pulley 8 is applied with pressurized oil through a passage 21b. The passage 21 is further communicated with a regulator valve 25 through an orifice 32. A constant pressure of oil regulated at the regulator valve 25 is provided in a passage 26. The passage 26 is communicated with an end chamber of the line pressure control valve 22, a solenoid operated on-off valve 27 and an accumulator 30 through an orifice 32a, with an end chamber of the transmission ratio control valve 23 and a solenoid operated on-off valve 28 through an orifice 32b, and with the other end chamber of the valve 23 through a passage 26a and an orifice 32c. The solenoid operated valves 27 and 28 are operated by duty signals from the control unit 40. When energized, the valves are communicated with a drain passage 29. Thus, actuating pressures controlled by the on-off valves 27 and 28 are applied to control valves 22 and 23.

The line pressure control valve 22 controls the line pressure PL in accordance with the transmission ratio of the transmission.

The transmission ratio control valve 23 has a spool which is shifted to an oil supply position by control oil in the opposite end chambers, communicating the passage 21 with the passage 24 and to an oil drain position for draining the oil from the passage 24. The operating conditions in two positions vary in accordance with the duty ratio, so that the flow rate of oil supplied to or drained from the cylinder 9 of the drive pulley 7 is controlled to provide optimum transmission ratio in dependency on the opening degree of the throttle valve and the speed of the engine.

The control unit 40 consisting of a microcomputer is provided with the transmission ratio control system and the line pressure control system, to which the cruise control system is operatively connected.

Figure 2:
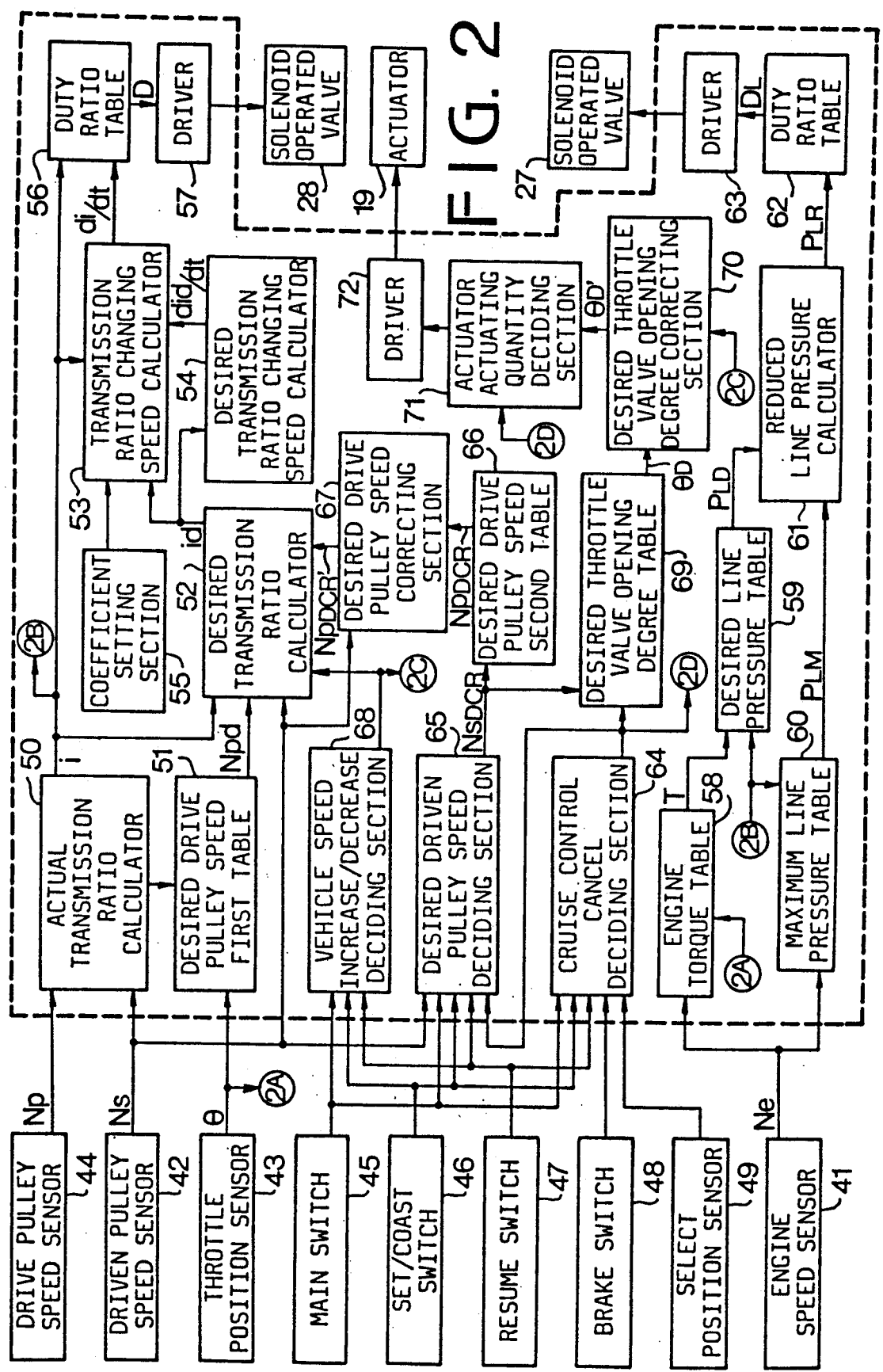
FIG. 2 shows a block diagram of a control unit of the system according to the present invention.

Referring to FIG. 2, the control unit has a drive pulley speed sensor 44, driven pulley speed sensor 42, throttle valve position sensor 43, main switch 45 for starting the cruise control, set/coast switch 46, brake switch 48, engine speed sensor 41, resume switch 47, and select position sensor 49. The set/coast switch 46 is adapted to produce a cruise set signal when a button of the switch is depressed for a short period and to produce a coast signal while the button is continuously depressed over a predetermined period.

A system for controlling the transmission ratio and the line pressure will be described. Output signals $N_P$ and $N_S$ of sensor 44, 42 are fed to an actual transmission ratio calculator 50 to produce an actual transmission ratio i in accordance with $i = N_P/N_S$. The actual transmission ratio i and output signal $\theta$ of the throttle position sensor 43 are fed to a desired drive pulley speed first table 51 to derive a desired drive pulley speed Npd in accordance with values of the ratio i and signal $\theta$. The desired drive pulley speed Npd and the driven pulley speed $N_S$ are fed to a desired transmission ratio calculator 52 to calculate a desired transmission ratio id in accordance with the speeds Npd and $N_S$ which corresponds to vehicle speed.

The desired transmission ratio id is fed to a desired transmission ratio changing speed calculator 54 which produces a desired transmission ratio changing rate did/dt. The speed did/dt is the amount of change of the desired transmission ratio id during a predetermined time interval. A coefficient setting section 55 is provided for producing coefficients K1 and K2. The actual transmission ratio i, desired transmission ratio id, desired transmission ratio changing rate did/dt and coefficients K1 and K2 are applied to a transmission ratio changing speed calculator 53 to produce a transmission ratio changing rate di/dt from the following formula.

$$di/dt = K1(id - i) + K2 \cdot did/dt$$

In the formula, the term of (id−i) is a control quantity dependent on the difference between the desired and actual transmission ratios and did/dt is a term for advancing the phase of the control operation.

The rate di/dt and actual ratio i are applied to a duty ratio table 56 to derive a duty ratio D in accordance with D = f (di/dt, i) using a table at upshift and downshift of the transmission. The duty ratio D is supplied to a solenoid operated on-off valve 28 through a driver 57.

On the other hand, engine speed Ne from the engine speed sensor 41 and throttle opening degree $\theta$ from the throttle position sensor 43 are applied to an engine torque table 58 to derive an engine torque T. The engine torque T and the actual transmission ratio i from the calculator 50 are applied to a desired line pressure table 59 to derive a desired line pressure $P_{LD}$.

In the hydraulic circuit, oil pressure discharged from the pump varies in accordance with the change of the engine speed Ne, so that a maximum line pressure $P_{LM}$ also varies. In order to detect the variance of the maximum line pressure $P_{LM}$, the control unit is provided with a maximum line pressure table 60 to which the engine speed Ne and the actual transmission ratio i are supplied. Therefore, the maximum line pressure $P_{LM}$ is obtained.

The desired line pressure $P_{LD}$ and the maximum line pressure $P_{LM}$ are applied to a reduced line pressure calculator 61 wherein a reduced line pressure $P_{LR}$ is calculated based on the proportion of the desired line pressure $P_{LD}$ to the maximum line pressure $P_{LM}$. The reduced line pressure $P_{LR}$ is applied to a duty ratio table 62 to derive a duty ratio $D_L$ corresponding to the reduced line pressure $P_{LR}$. The duty ratio $D_L$ is supplied to a driver 63 which operates a solenoid operated on-off valve 27 at the duty ratio.

Describing a system for the cruise control, a desired driven pulley speed deciding section 65 is applied with the driven pulley speed signal $N_s$ from the sensor 42, and output signals from switches 45 to 47.

When the main switch 45 for the cruise control is turned on and the set/coast switch 46 operates for a short period to produce the cruise signal, the desired driven pulley speed deciding section 65 operates to set the driven pulley speed $N_s$ applied to the section 65 at that time as a desired driven pulley speed $N_{SDCR}$, that is a desired cruising speed.

On the other hand, a cruise control cancel deciding section 64 is applied with output signals from the switches 45 to 48 and select position sensor 49. When the brake switch 48 is turned on, the set/coast switch 46 and the resume switch 47 are on at the same time, the select position sensor 49 produces a signal representing ranges other than a D range, or the main switch 45 is turned off, the cruise control cancel deciding section 64 operates to cancel the cruise control, so that the desired driven pulley speed $N_{SDCR}$ and an amount for actuating the actuator 19 become zero.

At setting of the cruise control, the section 65 derives the desired driven pulley speed $N_{SDCR}$ in accordance with the driven pulley speed $N_s$. The output signal $N_{SDCR}$ is fed to a desired drive pulley speed second table 66 from which a desired drive pulley speed $N_{PDCR}$ for the cruise control is derived. The signal $N_{PDCR}$ is applied to a desired drive pulley speed correcting section 67 where a corrected desired drive pulley speed $N_{PDCR}'$ is calculated in dependency on the desired drive pulley speed $N_{PDCR}$ and driven pulley speed $N_s$ from the section 66 and the sensor 42.

A vehicle speed increase/decrease deciding section 68 (first deciding means) is provided to be applied with output signals from the switches 45, 46 and 47 to produce an acceleration signal or a deceleration signal. The acceleration or the deceleration signal is applied to the desired transmission ratio calculator 52 to which the output signal of the correcting section 67 is applied, so as to obtain the desired transmission ratio id.

The output signals of the desired driven pulley speed deciding section 65 and cruise control cancel deciding section 64 are applied to a desired throttle valve opening degree table 69 so as to derive a desired throttle valve opening degree $\theta D$ during the cruise control. The desired throttle valve opening degree $\theta D$ is applied to a desired throttle valve opening degree correcting section 70 (second correcting means) to which the acceleration or deceleration signal from the section 68 is applied so as to correct the desired opening degree $\theta D$. A corrected desired opening degree $\theta D'$ is applied to a throttle actuator actuating quantity deciding section 71 (second correcting means), to which the output signal from the section 64 is applied. The section 71 determines an actuator actuating quantity in accordance with the throttle opening degree $\theta$ and the corrected desired degree $\theta D'$. An output signal of the section 71 is applied through a driver 72 (throttle valve control means) to the actuator 19 comprising a DC servo motor. The throttle valve 18 is controlled for providing the desired opening degree $\theta D'$.

Figure 3:
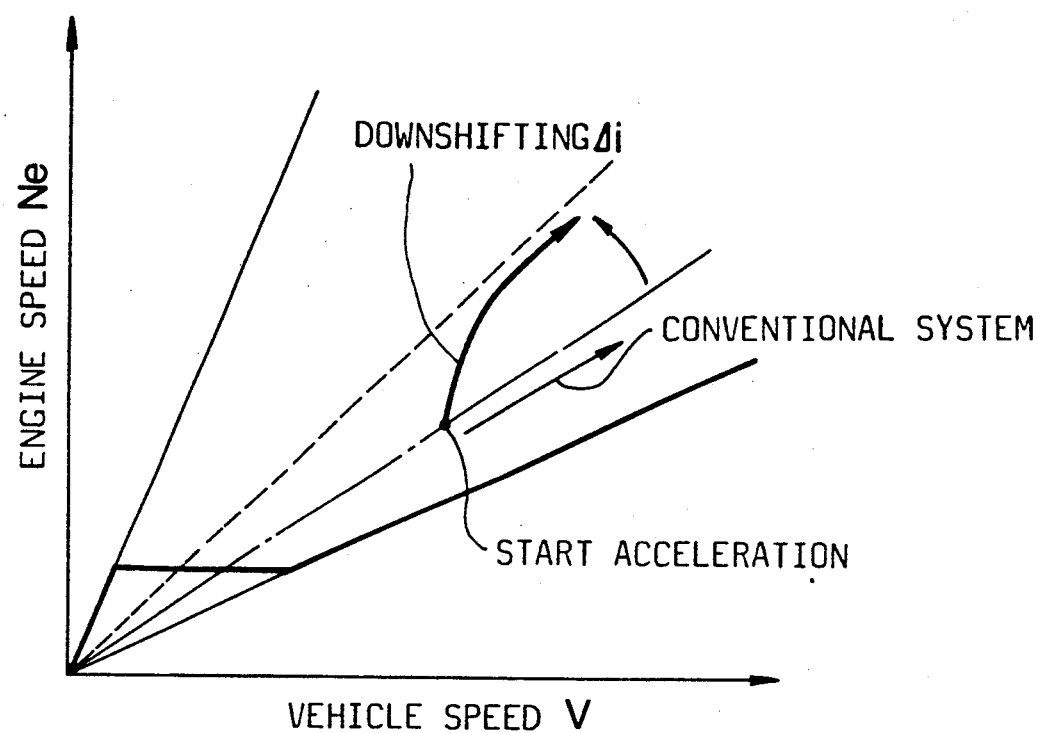
FIG. 3 is a graph showing a characteristic of the transmission ratio in accordance with the present invention.
Figure 4:
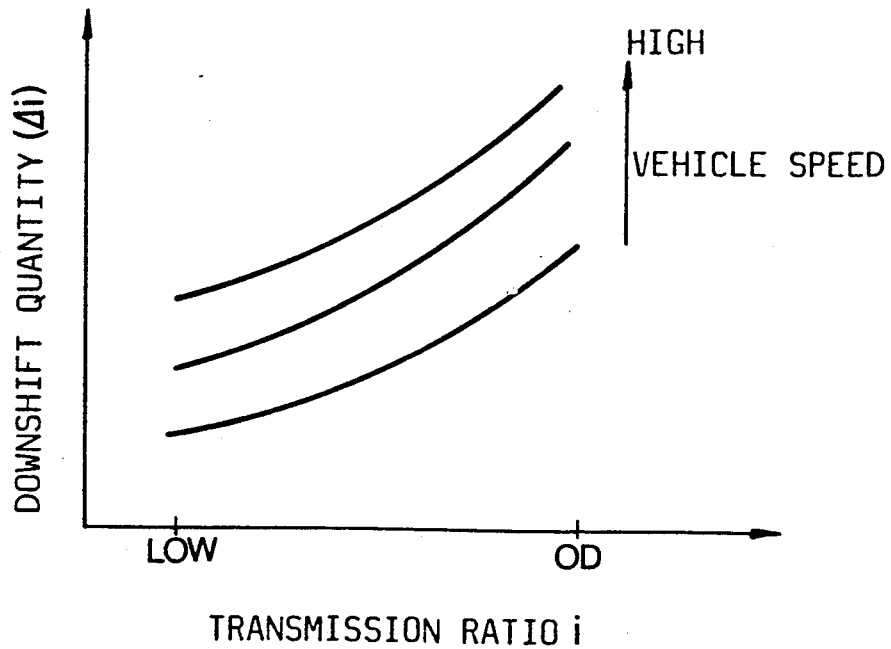
FIG. 4 is a graph showing downshift quantities in relation to the actual transmission ratio and vehicle speed.

When the resume switch 47 is turned on, the vehicle speed increase/decrease deciding section 68 feeds an acceleration signal to the desired transmission ratio calculator 52 and the throttle opening degree correcting section 70. In the calculator 52, a downshift quantity $\Delta i$ is added to the actual transmission ratio i at that time so as to downshift the transmission. As shown in FIG. 4, the downshift quantity $\Delta i$ is a function at least one of the actual transmission ratio i and driven pulley $N_s$, which is the present vehicle speed. Accordingly, the transmission is downshifted as shown by the curved arrow in FIG. 3.

On the other hand, the desired throttle opening degree correcting section 70 produces a signal $\theta D'$ so as to increase the actuating quantity of the actuator 19 when the acceleration signal is applied thereto. Accordingly, the throttle valve 18 is opened little by little thereby increasing the torque of the engine.

Figure 5:
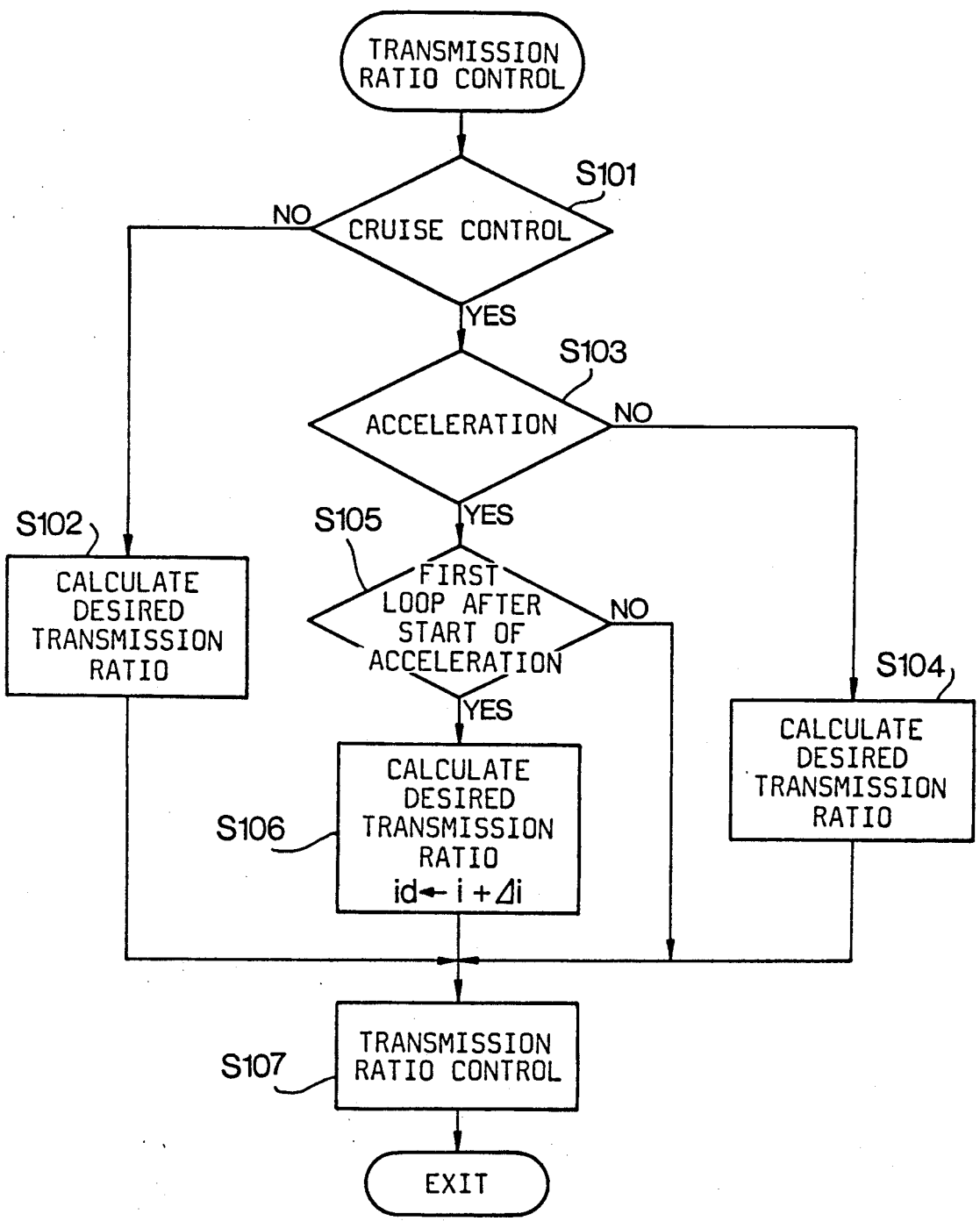
FIG. 5 is a flowchart showing the transmission ratio control operation of the system according to the present invention.

The operation of the system for controlling the transmission ratio will be described hereinafter with reference to the flowchart shown in FIG. 5.

At a step S101, it is determined whether the vehicle is in a cruise control. When the vehicle is not in cruise control, the program proceeds to a step S102 where the desired transmission ratio id is obtained in dependency on the desired drive pulley speed $N_{pd}$ derived from the first table 51. Thereafter, the program goes to a step S107 for the normal transmission ratio control.

If the cruise control is determined at the step S101, it is determined at a step 103 whether the acceleration of the vehicle is selected by the resume switch 47. If the switch 47 is not turned on, the desired transmission ratio id is calculated at the calculator 52 in dependency on the desired driven speed $N_{SDCR}$ and the desired drive pulley speed $N_{PDCR}$ derived from the respective tables 65 and 66 at step S104. The program further proceeds to the step S107.

When the acceleration is determined at the step S103, it is further determined at a step S105 whether the program is in the first loop immediately after the acceleration signal was generated. If it is the first loop, at a step S106, the downshift quantity $\Delta i$ is added to the actual transmission ratio i at the desired transmission ratio calculator 52. Accordingly, the transmission is downshifted at the step S107 as shown in FIG. 5. When the program is in a loop succeeding the first loop, the program proceeds directly to the step S107 from the step S105.

Thus, the transmission is downshifted right after the acceleration is selected. The throttle opening degree is increased at a larger transmission ratio than at cruising so that, as shown in the graph of FIG. 3, the vehicle is accelerated at a larger acceleration than the above described conventional cruising system.

Although in the presently described embodiment, the transmission downshifting quantity $\Delta i$ is set as a function at least one of the actual transmission ratio i and driven pulley speed $N_s$ which is the vehicle speed, the quantity $\Delta i$ may be set as a constant value.

From the foregoing, it will be understood that the present invention provides a cruise control system for a motor vehicle having a continuously variable transmission, wherein when a vehicle is intended for acceleration, the vehicle speed can be rapidly increased at a large acceleration by downshifting the transmission a predetermined quantity, as well as by opening the throttle valve.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A drive speed control system for a motor vehicle with a continuously variable transmission connected to an engine having, a throttle valve for controlling an amount of air-fuel mixture induced into said engine, a throttle actuator, a throttle position sensor for detecting an opening degree of said throttle valve and for producing a throttle opening degree signal, switch means for controlling a cruise speed of said motor vehicle and for generating a cruise control signal to automatically converge said cruise speed to a desired vehicle speed by actuating said throttle valve through said throttle actuator, cruise control cancel deciding means responsive to a brake switch and a select position sensor of said transmission for producing a cruise control cancel signal, a drive pulley speed sensor for detecting a drive pulley speed of said continuously variable transmission and for producing a drive pulley speed signal, and a driven pulley speed sensor for detecting a driven pulley speed signal, wherein an actual speed of said engine and an actual transmission ratio of said transmission are both automatically controlled in a cruise mode, so that said actual vehicle speed coincides with said desired vehicle speed, the improvement of the system which comprises:

an actual transmission calculator responsive to said drive pulley speed signal and said driven pulley speed signal for calculating an actual transmission ratio and for producing an actual transmission ratio signal;

first deciding means responsive to said cruise control signal for deciding acceleration of said motor vehicle in said cruise mode and for producing an acceleration signal;

desired driven pulley speed deciding means responsive to said driven pulley speed signal, said cruise control signal and said cruise control cancel signal for deciding a desired driven pulley speed to accelerate said vehicle and for producing a desired driven pulley speed signal;

desired drive pulley speed correcting means responsive to said driven pulley speed signal and said desired driven pulley speed signal for correcting a desired drive pulley speed by retrieving from a desired drive pulley speed table and for generating a desired drive pulley speed signal;

a desired transmission ratio calculator responsive to said actual transmission ratio signal, said throttle opening degree signal, said driven pulley speed signal, said acceleration signal and said desired drive pulley speed signal for calculating a desired transmission ratio and for producing a desired transmission ratio signal;

desired throttle valve opening degree deciding means responsive to said desired driven pulley speed signal and said cruise control cancel signal for deciding a desired throttle opening degree to open said throttle valve and for producing a desired throttle valve opening degree signal;

first correcting means responsive to said acceleration signal and said desired throttle valve opening degree signal for correcting said desired throttle valve opening degree and for generating a desired opening degree correcting signal;

second correcting means responsive to said desired opening degree correcting signal and said cruise control cancel signal for changing said engine speed to a desired engine speed corresponding to said desired transmission ratio and for producing a correction signal;

transmission ratio changing speed calculating means responsive to said actual transmission ratio signal and said desired transmission ratio signal for calculating a desired transmission ratio changing speed in order to reach said desired vehicle speed as soon as possible without losing power of said engine and for producing a desired transmission ratio changing speed signal;

driving means responsive to said actual transmission ratio signal and said desired transmission ratio changing speed signal for downshifting said transmission from said actual transmission ratio to said desired transmission ratio so as to increase said power for acceleration; and throttle valve control means responsive to said correction signal for actuating said throttle actuator to open said throttle valve.

* * * * *